UNITED STATES PATENT OFFICE.

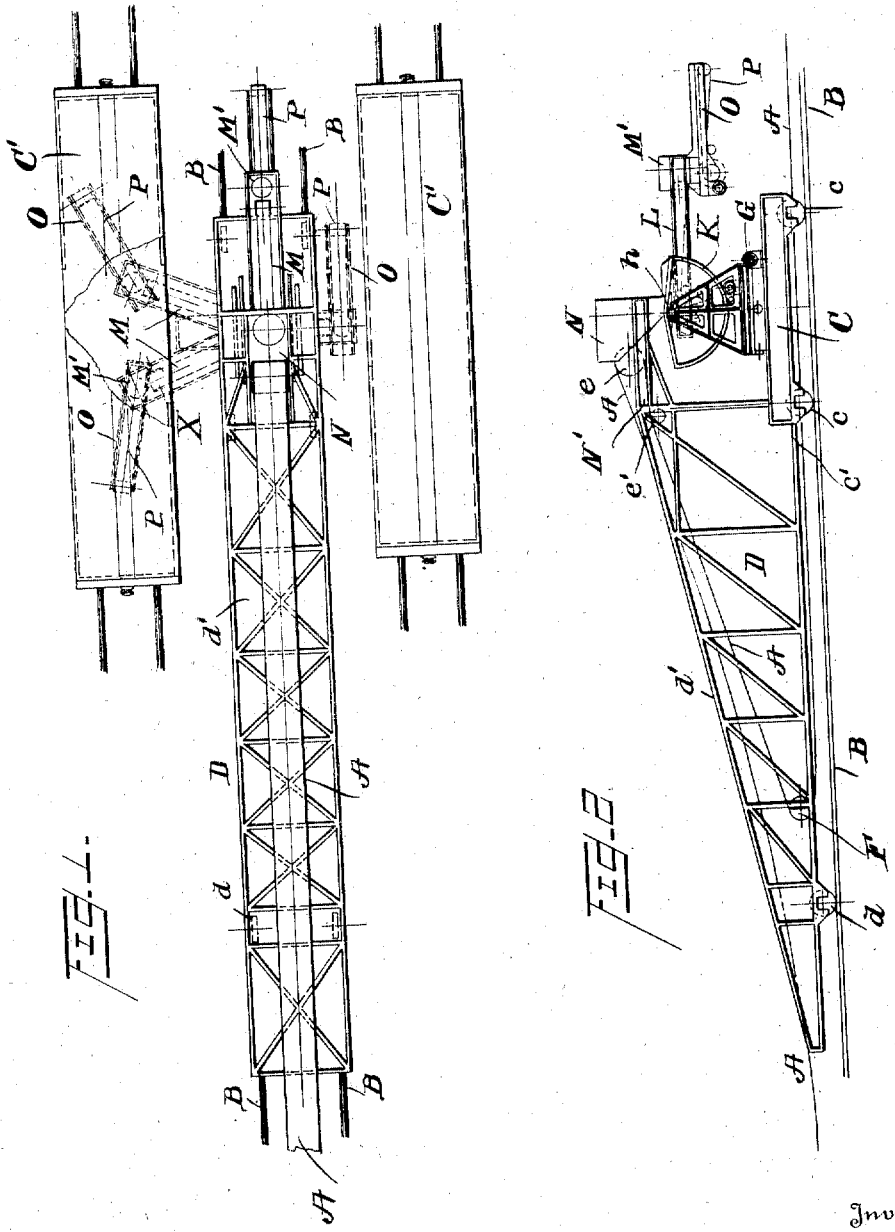

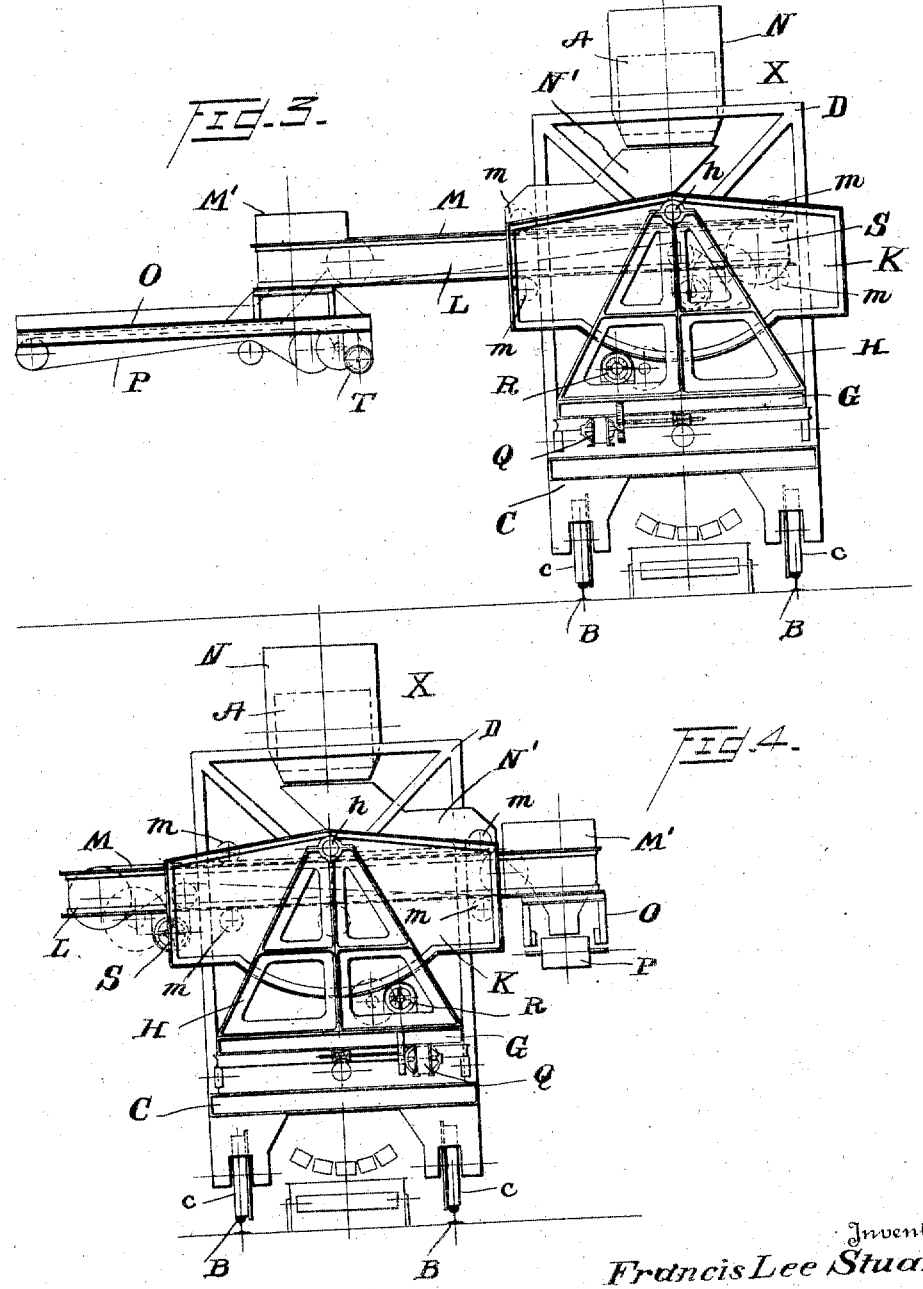

FRANCIS LEE STUART, OF BALTIMORE, MARYLAND.

CONVEYING AND LOADING APPARATUS.

1,231,449.      Specification of Letters Patent.      Patented June 26, 1917.

Application filed May 10, 1916. Serial No. 96,627.

*To all whom it may concern:*

Be it known that I, FRANCIS LEE STUART, a citizen of the United States, residing in Baltimore, Maryland, have invented certain new and useful Improvements in Conveying and Loading Apparatus, of which the following is a specification.

This invention relates to apparatus for conveying coal, ore and other such material by means of conveyer-belts to apparatus which receives the material so conveyed and delivers it to storage piles, bins, cars, boats, vessels or other receivers and the object of the invention is to provide an apparatus which may be used in connection with an ordinary conveyer-belt and which is so constructed that it may receive material from such conveyer and carry and deliver it to its destination at any desired elevation or in any desired vertical plane and which is movable to any required place while still in operative relation with the main conveyer.

My improvements are especially useful in loading or trimming freight cars, gondolas, box cars or other such carriers.

In the preferred way of carrying out my invention I employ a main conveyer-belt, which may be supported and operated in any usual way, and I connect with this belt an apparatus which is movable on a track to deliver at any required place alongside the track. The belt is formed with a looped portion supported on an inclined frame or truss mounted on a truck traversing the track, the belt being reeved in the inclined frame in such manner that the upper end of the looped portion thereof will always deliver at the same elevation, whatever be the position of the truck on the track. The truck supports a turntable on which is erected a frame supporting an oscillating box or cage which in turn supports a frame carrying a belt-conveyer receiving the material from the main conveyer and which is movable endwise in the oscillating cage. The frame of said receiving conveyer is so mounted that it may be turned horizontally to any desired vertical plane and may have its outer end raised and lowered to any required extent. The outer end of said conveyer frame supports another frame, carrying a delivery conveyer belt which receives material from the vertically oscillating and horizontally adjustable belt and which is itself pivotally connected with the outer end of the frame of said oscillating conveyer in such manner that it may be turned about a vertical axis to any required extent to deliver the material in any desired part of a box car, gondola or other carrier, said delivery conveyer being so mounted that it occupies at all times a plane parallel with that of the receiving conveyer.

In the accompanying drawings,

Figure 1 is a plan view of conveying and loading apparatus embodying my improvements.

Fig. 2 shows a side elevation thereof.

Fig. 3 shows an end elevation of the loading apparatus.

Fig. 4 is a view of the opposite end thereof.

The main conveyer belt A is mounted and guided in any suitable way between the rails of the track B. It may convey material from any distant point and may be driven by any well known mechanism. The apparatus X, to which the main conveyer delivers, comprises a truck C, the wheels $c$ of which traverse the track B, and this truck is connected as shown at $c'$ with a trussed frame D which at its outer end is supported by wheels $d$ resting on the track. The frame D has an inclined part $d'$ extending from the outer end of the frame to the upper portion E thereof in which is mounted a pulley $e$ over which the conveyer-belt extends and from the under side of which the belt passes to a guide pulley $e'$ and thence to a pulley F over which it passes and then continues in the manner clearly shown in Fig. 2. In this way a tripper is provided which causes the conveyed material to be delivered to the receiving conveyer hereinafter described.

The truck C supports a turntable G and on the turntable is mounted a frame H in which is hung at $h$ a box-like frame or oscillating cage K which supports the frame L of a horizontally arranged conveyer-belt M.

The main conveyer delivers to a stationary hopper N which in turn delivers to another hopper N' movable with and discharging onto the conveyer M. This latter conveyer M may be called the receiving conveyer inasmuch as it receives the material delivered by the main conveyer-belt. The outer end of the frame L supports the frame O of a conveyer-belt P which delivers the material to any desired place or receptacle. The inner end of the frame O is mounted to turn about a vertical axis so that the delivery conveyer may be adjusted to any desired angle, but it is always maintained in a plane parallel with that of the conveyer M. The frame L of the receiving conveyer is suitably mounted and guided for adjustment lengthwise, horizontally, in the frame or cage K, being suitably guided by rollers $m$, and the conveyer M carried by this frame is therefore, by reason of the construction before described, capable of being oscillated about the axis $h$, of being extended horizontally from this frame and of also being turned about a vertical axis by reason of the fact that it is mounted on the turntable G.

Various adjustments may thus be obtained for the receiving conveyer, the outer end of which delivers to the hopper M', which feeds the discharging conveyer P. This conveyer is hung from a turntable on the outer end of the frame L and can be turned about a vertical axis to any desired extent. Any suitable means may be employed for operating the mechanism. For instance, the frame H may be turned about its vertical axis by means of a motor Q operatively connected with the turntable in any suitable way. The oscillating frame K may be swung to any desired extent by motor mechanism R suitably connected therewith. The receiving conveyer-belt M may be driven by suitable motor mechanism S and the delivery conveyer-belt P may be driven by similar motor mechanism T. These details of construction are not important as my invention relates more particularly to the manner in which the receiving conveyer is mounted and adjusted and delivers to a discharging conveyer mounted for adjustment in the manner before described.

It will be observed, by reference to Fig. 1, that by reason of my improvements cars C' on opposite sides of the track may be loaded and trimmed and the delivery conveyer may be moved around to either side of the main conveyer and may be adjusted to the desired angle to deliver either to gondolas, box cars or other carriers. Fig. 1 indicates how the receiving conveyer and the delivery conveyer may be inserted into a box car and how the delivery conveyer may be moved to various positions in the car to deliver thereto and distribute the material therein.

One of the principal objects of my invention is to avoid, as far as possible, the breakage of material, and it will be observed that in my apparatus the material passes gently from the main conveyer-belt to the receiving conveyer on the loading apparatus and that it passes gently from the receiving conveyer to the delivery conveyer. The loading apparatus can be moved about a horizontal axis so as to hold the outer end of the delivery conveyer close to the pile or point of delivery in such manner that there is but little fall for material while being delivered.

I claim as my invention:

1. The combination of a car supporting track, a truck supporting track parallel therewith, a main belt conveyer parallel with said truck supporting track, a truck supported by and moving on said truck supporting track and provided with a tripper, a loop formed in the main conveyer belt and supported by the tripper, and loading apparatus supported by the truck comprising a main supporting frame, a receiving conveyer onto which the tripper discharges having a frame mounted to swing about a vertical axis in a horizontal plane and to move endwise in the main frame, and a discharging conveyer belt mounted to turn about a vertical axis and to also move with the receiving conveyer endwise relatively to the main supporting frame.

2. Loading apparatus comprising a main supporting frame, a receiving conveyer belt having a frame mounted to swing in a horizontal plane, to oscillate in a vertical plane, and to move endwise in the main frame, and a discharging conveyer belt mounted to turn with respect to said receiving conveyer frame about a vertical axis and to receive material from the receiving conveyer belt and which is also mounted to move coincidently with said receiving belt frame both vertically and horizontally relatively to the main supporting frame.

3. The combination of a main conveyer belt provided with a tripper, a supporting frame for the tripper which is movable to any desired extent while still maintaining the operative relation of the tripper with the main conveyer belt, a receiving conveyer onto which the tripper discharges, a frame for said conveyer mounted on the main supporting frame to swing about a vertical axis, to oscillate upon a horizontal axis, and which is slidable in the main supporting frame, and a discharging conveyer receiving material from the receiving conveyer and which is connected with the frame thereof to turn independently of said receiving conveyer about a vertical axis and to also move therewith endwise relatively to the main supporting frame, horizontally about a vertical axis and vertically about a horizontal axis.

4. Loading apparatus comprising a supporting frame, a receiving conveyer mounted to swing in a horizontal plane, to oscillate in a vertical plane, and to move endwise in the supporting frame, and a discharging conveyer which is supported by the outer end of said receiving conveyer and is mounted thereon to swing with respect to the receiving conveyer about a vertical axis and to also move coincidently with said receiving conveyer when the latter is adjusted either horizontally, vertically or endwise.

5. The combination of parallel car supporting tracks, an intermediate track parallel with the car supporting tracks, a truck mounted on said intermediate track, a main conveyer belt connected with said truck and provided with a tripper, a conveyer receiving material from the tripper and mounted to swing in a horizontal plane from one side of the truck to the other to deliver to cars on either track and mounted also to move endwise in its frame, and a discharging conveyer supported by the outer end of said receiving conveyer and mounted thereon to swing about a vertical axis.

In testimony whereof, I have hereunto subscribed my name.

FRANCIS LEE STUART.

Witnesses:
E. R. SPARKS,
A. H. SCHAEFFER.